C. A. & I. S. BROWNE.
Electrical Condensers.

No. 151,004. Patented May 19, 1874.

WITNESSES:

INVENTOR:

ATTORNEYS.

UNITED STATES PATENT OFFICE.

CHARLES A. BROWNE AND ISAAC S. BROWNE, OF NORTH ADAMS, MASS.

IMPROVEMENT IN ELECTRICAL CONDENSERS.

Specification forming part of Letters Patent No. 151,004, dated May 19, 1874; application filed February 14, 1874.

*To all whom it may concern:*

Be it known that we, CHARLES A. BROWNE and ISAAC S. BROWNE, of North Adams, in the county of Berkshire and State of Massachusetts, have invented a new and Improved Electrical Condenser, of which the following is a specification:

Our invention relates to the construction of Leyden jars or condensers composed of india-rubber plates with embedded tin-foil sheets; and it consists in so constructing the condenser in sections that in case a rubber plate is ruptured by a spark the damage can be repaired by simply readjusting the sections, or, at most, by the loss of a section only instead of the whole jar, as when all the plates are vulcanized together.

Figure 1:
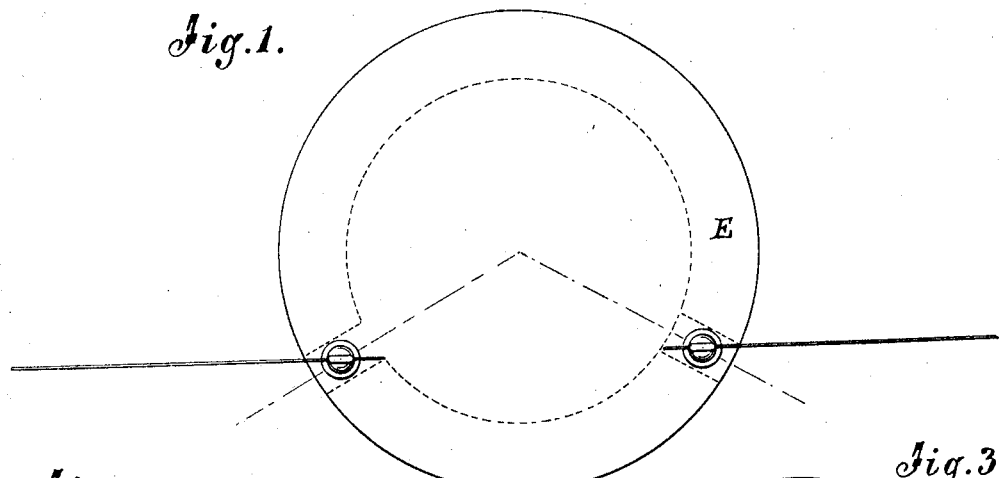
Figure 2:
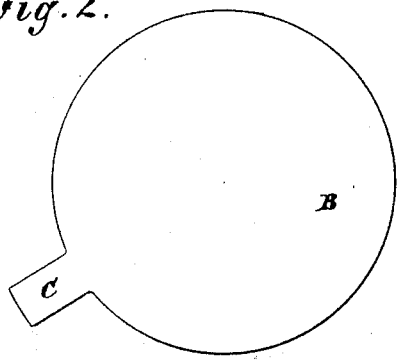
Figure 3:
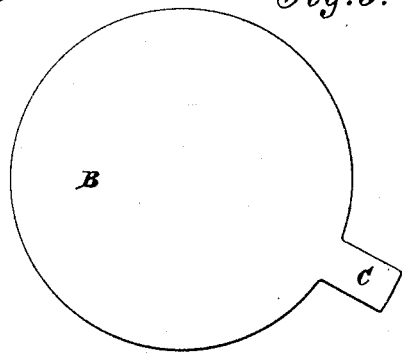
Figure 4:
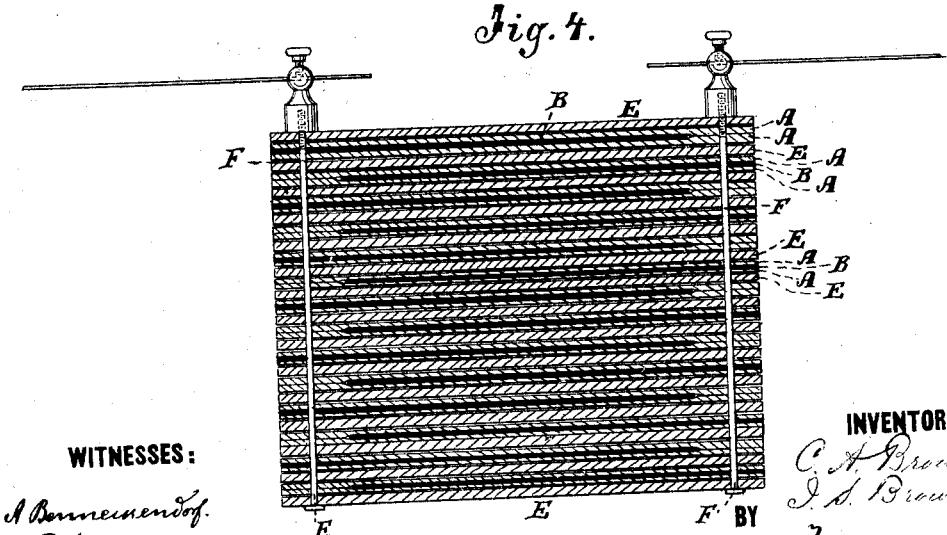

Figure 1 is a top view of a condenser; Figs. 2 and 3, diagrams of the tin-foil sheets used; and Fig. 4 is a sectional elevation of a condenser.

Similar letters of reference indicate corresponding parts.

Heretofore, these condensers have been made of rubber plates A and tin-foil plates B, a tin-foil plate being inclosed between two plates, and all the rubber plates vulcanized together. We find in practice that the sulphur of the rubber compound produces, when vulcanized in the presence of the tin-foil, a gas which sometimes makes bubbles in the rubber plates, which render them so thin that sparks will sometimes escape through and rupture them. These ruptures render the condenser unfit for use and it cannot be repaired. We therefore propose to make the condenser of independent sections, each comprising two of the rubber plates with a tin-foil plate embedded between them, securing the sections together by the rods or bolts F, which make the electrical connections of the different electrodes or by any other means.

We take two disks, A, of plastic rubber, and a smaller plate, B, of tin-foil, having a tongue, C, place them together in the usual way of making condensers of this character, and then vulcanize the two rubber plates separately instead of putting all the plates for a condenser in one pile and vulcanizing them at once, thus making the sections separate and independent of each other. These sections we then pile one upon another, as many as we require for a condenser, and fasten them with the binding-screws F, or by any other means.

In building up the pile of sections we alternate the sections so as to form the two electrodes in the way they are commonly arranged in condensers of this character. Thus, if a rubber plate is ruptured, the section to which it belongs can be taken out and another put in its place. It will not even be necessary to provide a new section until more than two are ruptured, for ruptured sections can be used for the outside sections by placing the ruptured plate outward, as well as any other, and they may be readily changed to the outside.

We also propose, as a means of preventing rupture, to place a thin disk or layer of vulcanized rubber, E, between each section of the condenser, to use rubber not subject to the flaws and imperfect places produced by the presence of the tin-foil with the rubber in the vulcanizing process, and thus have such perfect separation of the tin-foil plates as to prevent rupture altogether.

Having thus described our invention, we claim as new and desire to secure by Letters Patent—

An electrical condenser composed of rubber plates, with embedded tin-foil plates constructed of independent sections, substantially as herein described, for readjusting and replacing ruptured plates, substantially as specified.

CHAS. A. BROWNE.
     ISAAC S. BROWNE.

Witnesses:
 C. A. PECK,
 G. L. RICE.